UNITED STATES PATENT OFFICE.

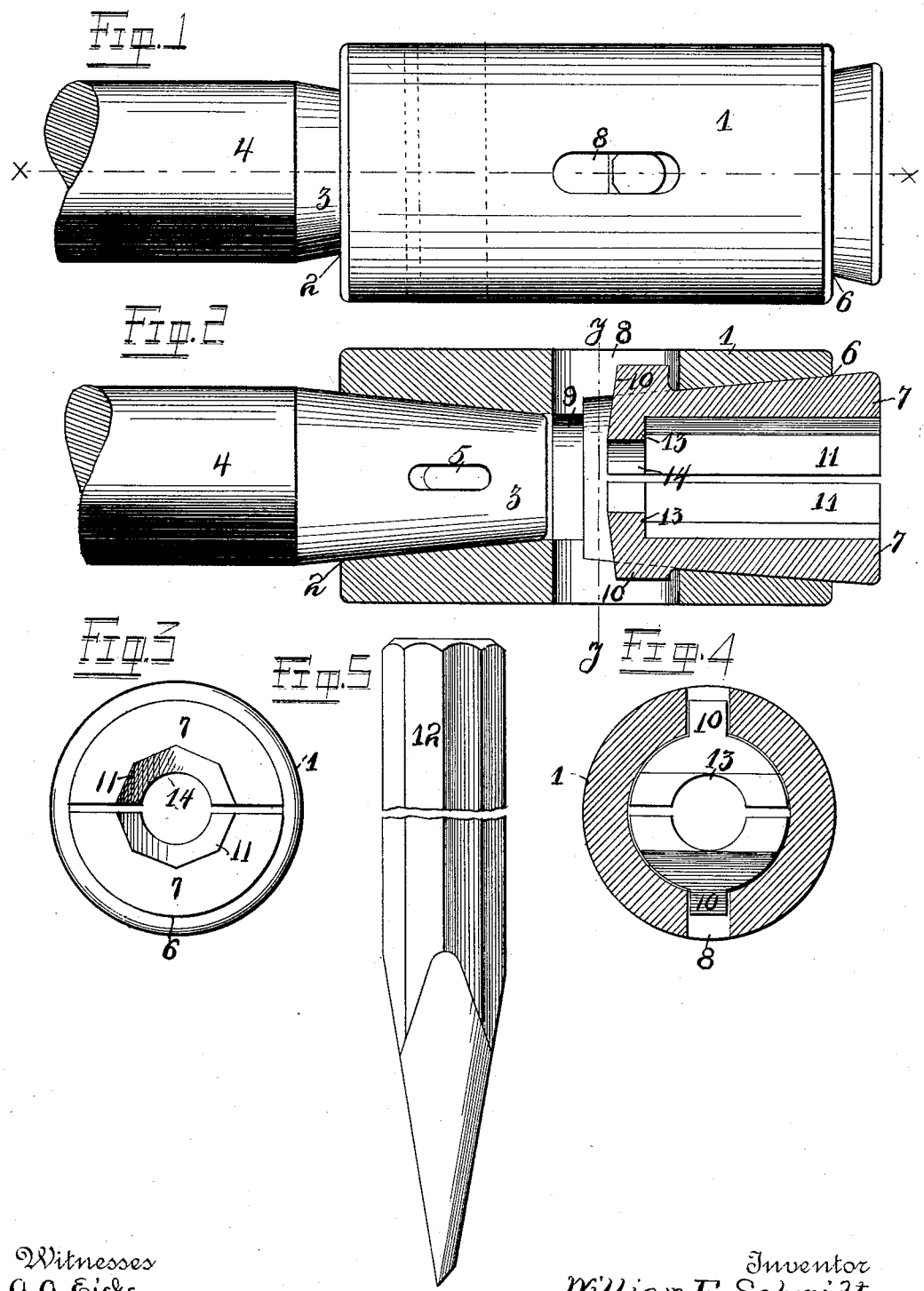

WILLIAM F. SCHMIDT, OF ST. LOUIS, MISSOURI.

CHUCK.

SPECIFICATION forming part of Letters Patent No. 481,426, dated August 23, 1892.

Application filed January 25, 1892. Serial No. 419,181. (No model.)

*To all whom it may concern:*

Be it known that I, WILLIAM F. SCHMIDT, of the city of St. Louis and State of Missouri, have invented certain new and useful Improvements in Chucks, of which the following is a full, clear, and exact description, reference being had to the accompanying drawings, forming a part hereof.

My invention relates to improvements in "chucks;" and it consists in the novel arrangement and combination of parts, as will be more fully hereinafter described, and designated in the claim.

In the drawings, Figure 1 is a top plan view of my complete chuck as applied to the piston of a mining-machine. Fig. 2 is a longitudinal section of my complete invention, taken on the line $x$ $x$ of Fig. 1. Fig. 3 is a front elevation of the chuck or that end which receives the cutting-tool. Fig. 4 is a vertical cross-section taken on the line $y$ $y$ of Fig. 2, and Fig. 5 is a plan view of a cutting-tool which is constructed according to my invention.

My improved chuck is especially constructed to be attached to the piston of an ordinary mining-machine, but can be applied to other machines where chucks are employed for holding the tool.

Referring to the drawings, 1 represents the chuck proper, which is suitably shaped in outline to answer the purpose and to accommodate itself to the piston-rod of a mining-machine. In one end of the chuck 1 is formed a socket 2, the surface of which is inclined and is adapted to receive the tapered end 3 of the piston 4 of the mining-machine. It will be readily understood that by the construction of the socket 2 the said chuck when properly placed in position on the tapering end of the piston 4 will be held in a rigid position to said piston; but in order to hold said chuck and to avoid any possibility of the chuck becoming disarranged a key 5 is employed, which passes through suitable openings formed in both the socket and the tapering end of the piston.

6 represents a second tapering socket, which is formed in the opposite end of the said chuck and is of larger dimensions than the socket 2, previously referred to, which socket receives the movable jaws 7, the form of which will be hereinafter more fully described.

8 represents a vertical opening of suitable width, the sides of which are parallel to one another, intersecting the two sockets 2 and 6. The socket 6 is in communication with a circular opening 9, which opening is of smaller dimensions than the end of the said socket 6, but of the same dimensions as the end on the socket 2. The movable clamping-jaws are two in number and substantially alike and adapted to be located within the socket 6 of the chuck. Each of the jaws are half-round in cross-section, the outer surfaces of which are inclined, the incline of which corresponds to the incline of the socket 6, the said two inclined surfaces coming in contact with one another when the drill or tool is properly inserted in the chuck and between the jaws.

The rearward portions of the jaws 7 are each provided with extensions 10, which when the jaws are in their proper positions in the said chuck the said projection will be located near the ends of the opening 8, as better illustrated in Fig. 1. The extensions 10 are of such a dimension that they will allow the jaws 7 to move in a longitudinal direction, but prevent movement of the said jaws in a transverse direction—namely, preventing said jaws from turning independent of the chuck.

11 represents the inner surfaces of the movable jaws 7, each of which is provided with four flat surfaces in order to accommodate the octagon-shaped drill or tool 12. The interior surfaces 11 of the jaws 7 terminate by the shoulders 13 of said jaws, said portions 13 being cut away in a half-circular form, which leaves a space 14. The forward portions of the jaw 7 project beyond the front of the chuck, whereby the said jaws are of sufficient length to allow for longitudinal movement of the said jaws and permit the same to receive drills of various sizes. In uniting the various parts of the chuck one of the jaws 7 is first placed in position in the chuck, as shown, after which the other of said jaws is inserted into the chuck, the space between the two jaws and the inclined surfaces formed on both the socket and the movable jaws allowing sufficient space to permit the said jaws to be inserted into the said socket in the manner above stated. It may be premised in this connection that the lug or extension 10, formed on the lower of said jaws 7, is a little shorter than the corresponding lug formed on the upper jaw, which allows the said lower jaw to be more easily inserted after the upper jaw has been first inserted. Of course it will be readily understood that the dimensions of the jaws 7 largely depend upon the simple manner in which the said jaws may be inserted into the chuck.

From the foregoing description it will be readily perceived that after the jaws have been properly inserted into the chuck it will be impossible for the same to fall out, as the tendency of the lower jaw is to rest in the position as shown in Fig. 2 of the drawings, and should there be no drill inserted into said chuck the tendency of the upper jaw would be to rest upon the lower jaw, and the projection upon said upper jaw preventing the said jaw from passing out of its socket.

It will be readily understood that when the chuck is properly attached to the piston of the mining-machine the said chuck is never rotated, and consequently if the jaws are placed in position, as shown in Fig. 2, they will work properly and without any inconvenience on the part of the operator.

In Fig. 5 I have shown the construction of the drill which I employ in the chuck before described, which is constructed from a bar of metal octagon in cross-section, and the cutting-edge tapered down in the usual manner. Thus it will be seen that I construct a very inexpensive drill without in any way changeing one end of the said drill for conforming it to the chuck, which is usual in drills employed by this class of machinery. Before the drill is inserted between the jaws 7 of the chuck the said jaws will be moved forward to their full movement, allowing all the space necessary between said jaws to allow the insertion of the drills, after which by a pressure upon the drill imparted upon the cutting-edge of the same the said jaws will be moved rearward and clamp firmly upon the said drill, holding the same in that position until it is desired to remove the said drill from the chuck. The rear surfaces of the jaws 7 are inclined, as shown at 15, against which surfaces a wedge is adapted to come in contact when the said wedge is inserted in the opening 8 of the chuck for releasing the grip of the jaws upon the tool located between the same, which will cause the said jaws to be forced outward, the result of which is well known.

The chuck above described is very simple in construction, inexpensive, and not liable to get out of order through the rough usage to which it is necessarily exposed, and, further, by the construction of the chuck as above described a drill of very nominal cost may be used.

Having fully described my invention, what I claim is—

The combination, with a chuck provided with an inwardly-tapering conical socket, and with a transverse slot intersecting the latter, of two inwardly-tapering semi-conical jaws provided with opposing angular grooves and with lugs 10, normally seated in said transverse slot, the rear ends of the jaws being reversely beveled in line with the lugs, substantially as and for the purpose set forth.

In testimony whereof I affix my signature in presence of two witnesses.

WILLIAM F. SCHMIDT.

Witnesses:
 ED. E. LONGAN,
 C. F. KELLER.